(12) United States Patent
Feluch

(10) Patent No.: US 7,468,679 B2
(45) Date of Patent: Dec. 23, 2008

(54) METHOD AND APPARATUS FOR MUD PULSE TELEMETRY

(76) Inventor: Paul Feluch, RR 2, Okotoks (CA) T1S 1A2

( * ) Notice: Subject to any disclaimer, the term of this patent is extended or adjusted under 35 U.S.C. 154(b) by 451 days.

(21) Appl. No.: 11/164,510

(22) Filed: Nov. 28, 2005

(65) Prior Publication Data

US 2007/0182583 A1    Aug. 9, 2007

(51) Int. Cl.
*G01V 3/00* (2006.01)
(52) U.S. Cl. .................... 340/855.4; 367/83; 367/84; 175/40; 175/45
(58) Field of Classification Search .............. 340/855.4; 175/40, 48, 50; 367/83, 84
See application file for complete search history.

(56) References Cited

U.S. PATENT DOCUMENTS

| | | | |
|---|---|---|---|
| 3,789,510 A | 2/1974 | Richter, Jr. et al. | |
| 3,813,656 A | 5/1974 | Fowler | |
| 4,914,637 A | 4/1990 | Goodsman | |
| 5,103,430 A | 4/1992 | Jeter et al. | |
| 5,332,048 A | 7/1994 | Underwood et al. | |
| 5,774,420 A | 6/1998 | Heysse et al. | |
| 6,173,793 B1 | 1/2001 | Thompson et al. | |
| 6,237,404 B1 | 5/2001 | Crary et al. | |
| 6,626,253 B2* | 9/2003 | Hahn et al. | 175/48 |
| 6,714,138 B1 | 3/2004 | Turner et al. | |
| 6,845,563 B2 | 1/2005 | Lewis et al. | |
| 2004/0069535 A1* | 4/2004 | Hahn et al. | 175/57 |
| 2004/0108138 A1* | 6/2004 | Cooper et al. | 175/26 |
| 2006/0254819 A1* | 11/2006 | Moriarty | 175/40 |
| 2007/0056771 A1* | 3/2007 | Gopalan et al. | 175/40 |

* cited by examiner

*Primary Examiner*—Timothy Edwards, Jr.
(74) *Attorney, Agent, or Firm*—Maxey Law Offices, PLLC; Stephen Lewellyn; Brittany J. Maxey

(57) ABSTRACT

An apparatus for mud pulse telemetry for transmitting information from a drill string positioned at a down hole location in a bore hole to a surface location, the drill string having a flow passage through which a drilling fluid flows is provided. In one aspect, the apparatus includes a rotor pulser having an uncompensated drive train comprising a unique uncompensated seal comprising a stacked array of seal elements. The uncompensated drive train provides for the direct coupling of a rotor to a drive motor. The drive motor is located within an internal housing that is filled with gas at atmospheric pressure. Additionally, a method of operating the apparatus is provided. The method includes measuring drilling fluid pressure within the flow passage to determine when a pipe connection is being made to the drill string to initiate the measurement of a down hole parameter. The down hole parameter information is transmitted to the surface through a series of encode pressure pulse generated in the drilling fluid.

12 Claims, 9 Drawing Sheets

METHOD AND APPARATUS FOR MUD PULSE TELEMETRY

BACKGROUND OF THE INVENTION

1. Field of the Invention

The present invention relates generally to mud pulse telemetry. More particularly, relating to mud pulse apparatus having an uncompensated pulser and method of operating the apparatus in conjunction with standard drilling operation procedures, such as connection pipe sections to a drill string.

2. Description of the Related Art

Mud pulse telemetry systems are known in the art of drilling bore holes. The systems transmitting measured down hole parameter information to the surface through coded pressure pulses. The systems are used to transmit down hole information useful to the operation of drilling the bore hole and information pertaining to the formation through which the bore hole is being drilled. Examples of mud pulse telemetry system are described in U.S. Pat. Nos. 6,845,563; 5,774,420; 6,714,138; and 4,914,637, the entirety of which is incorporated herein by reference

SUMMARY OF THE INVENTION

In accordance with the present invention, a method and apparatus for mud pulse telemetry is provided. The method and apparatus in accordance with the present invention provides for a low cost, unmanned, wireless survey tool for the drilling industry.

In general, in one aspect, a telemetry apparatus for transmitting information from a drill string positioned at a down hole location in a bore hole to a surface location, the drill string having a flow passage through which a drilling fluid flows is provided. The telemetry apparatus including a pulser positioned within the flow passage approximate the down hole location for generating a series of positive pressure pulses in the drilling fluid which are encoded to contain the information to be transmitted. The pulser comprising, a rotor capable of at least partially blocking the flow passage, a motor positioned within an internal housing defined by the pulser, the housing being filled by a gas at atmospheric pressure, a drive shaft extending from the drive motor to a position external of the internal housing, the drive shaft is connected to said rotor, and a seal positioned about the drive shaft such that the seal seals the internal housing.

In general, in another aspect, a telemetry apparatus for transmitting information from a drill string positioned at a down hole location in a bore hole to a surface location, the drill string having a flow passage through which a drilling fluid flows is provided. The telemetry apparatus including a rotor capable of at least partially blocking the flow passage, a motor positioned within an internal housing defined by the pulser, the housing being filled by a gas at atmospheric pressure, a drive shaft extending from the drive motor to a position external of the internal housing, the drive shaft is connected to said rotor, a seal positioned about the drive shaft such that the seal seals the internal housing, a stator co-axially aligned with the rotor and having at least one flow channel through which the drilling fluid is directed, and the rotor being angularly rotated by said motor into a first operative position where the rotor at least partially blocks the at least one flow channel and into a second inoperative position where the drilling fluid is free to flow through the at least one flow channel.

In general, in another aspect, a telemetry apparatus for transmitting information from a drill string positioned at a down hole location in a bore hole to a surface location, the drill string having a flow passage through which a drilling fluid flows is provided. The telemetry apparatus including a body for positioning in the flow passage of the drill string approximate the down hole location, the body directing the drilling fluid therethrough, a rotor capable of at least partially blocking the flow passage when rotated into a first position and at least partially reducing the blockage when rotated into a second position, wherein rotation of the rotor creates positive pressure pulses in the drilling fluid, which are encoded to contain the information to be transmitted, a drive motor positioned within a gas filled internal housing that is defined by the body, a drive shaft extending from the motor at least partially outward from said internal housing and connected to the rotor, and a seal received by the body such that the drive shaft extends axially through the seal and such that the seal seals the internal housing.

In general, in another aspect, a telemetry apparatus for transmitting information from a drill string positioned at a down hole location in a bore hole to a surface location, the drill string having a flow passage through which a drilling fluid flows is provided. The telemetry apparatus including a body for positioning in the flow passage of the drill string approximate the down hole location, the body directing the drilling fluid therethrough; a rotor capable of at least partially blocking the flow passage when rotated into a first position and at least partially reducing the blockage when rotated into a second position, wherein rotation of the rotor creates positive pressure pulses in the drilling fluid, which are encoded to contain the information to be transmitted; a drive motor positioned within a gas filled internal housing that is defined by the body; a drive shaft extending from the motor at least partially outward from said internal housing and connected to the rotor; a seal received by the body such that the drive shaft extends axially through the seal and such that the seal seals the internal housing; a pressure sensor positioned such that the drilling fluid within the flow passage acts upon the sensor for measuring the drilling fluid pressure within the flow passage; a measurement sensor for measuring a down hole parameter; and a microprocessor connected to the pressure sensor, the measurement sensor and the motor for taking drilling fluid pressure readings, down hole parameter measurement and controlling the operation of the motor to rotate the rotor based upon the drilling fluid pressure and the down hole parameter measurement, thereby generating the positive pressure pulses within the drilling fluid.

In general, in another aspect, a method for transmitting information from a drill string positioned at a down hole location in a bore hole to a surface location, the drill string having a flow passage through which a drilling fluid flows is provided. The method comprising the steps of:

measuring drilling fluid pressure to detect a predetermined drop of drilling fluid pressure and then a subsequent predetermined rise of drilling fluid pressure; and generating a sequence of positive pressure pulses in the drilling fluid at a position approximate the down hole location that propagates in a direction towards the surface location, the sequence of positive pressure pulses being generated at a time after the predetermined rise of drilling fluid pressure is detected, the sequence of positive pressure pulses are encode with the information to be transmitted to the surface location.

In general, in another aspect, a method for transmitting information from a drill string positioned at a down hole location in a bore hole to a surface location, the drill string having a flow passage through which a drilling fluid flows is provided. The method comprising the steps of:

directing the drilling fluid across a rotor positioned approximate the down hole location, the rotor capable of at least partially obstructing the flow passage by rotating into a first position and capable of at least partially reducing the obstruction by rotating into a second position, the rotation of the rotor being effected by a drive assembly including a motor;

measuring drilling fluid pressure to detect a predetermined drop of drilling fluid pressure and then a subsequent predetermined rise of drilling fluid pressure; and generating a sequence of positive pressure pulses in the drilling fluid at a position approximate the down hole location that propagates in a direction towards the surface location, the sequence of positive pressure pulses being generated at a time after the predetermined rise of drilling fluid pressure is detected, the sequence of positive pressure pulses are encode with the information to be transmitted to the surface location.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
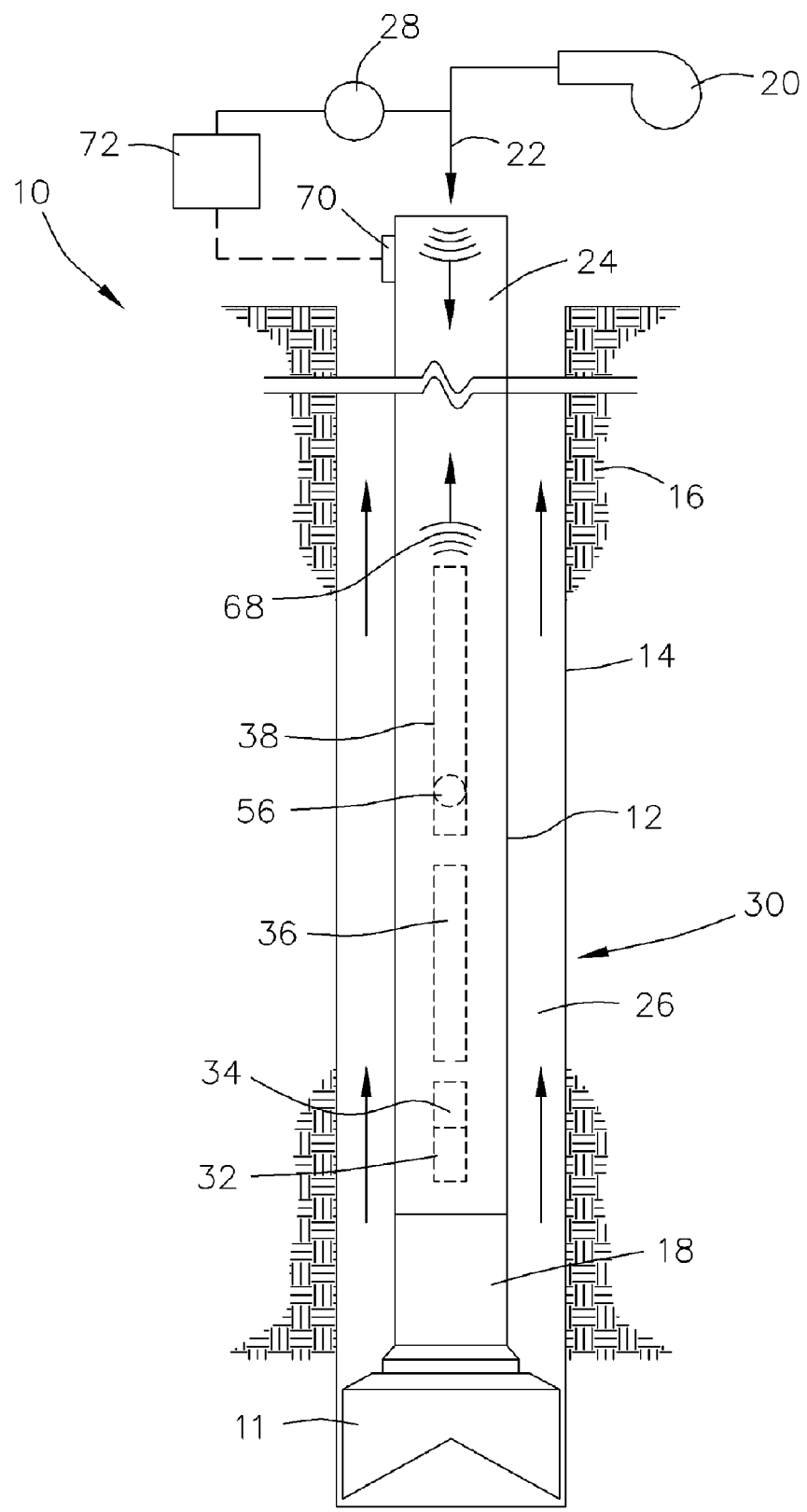
FIG. 1 is a diagram, partially schematic, showing a drilling operation employing the mud pulse telemetry system in accordance with the present invention.

With reference to FIG. 1, a bore hole drilling operation including a mud pulse telemetry system 10 in accordance with the current invention is shown. Drill bit 11 attached to a down hole end of a drill string 12 drills a bore hole 14 into a formation 16. The drill string 12 is conventional and is comprised of several sections of pipe coupled together. The drill string 12 can be rotated at the surface using conventional equipment to drill the bore hole 14 or the drill string can include down hole motor 18 for rotating the drill bit 10, thereby drilling the bore hole. The drilling operation further includes a typical drilling fluid or drilling mud system having a drilling fluid pump 20 which pumps drilling fluid 22 down a flow passage 24 of the drill string 12 where it then flows outward from the drill bit 10 into the annulus 26 between the outer surface of the drilling string and the bore hole 14. The drilling fluid 22 then continues to flow upward through the annulus 26 to the surface where it is cleaned by a drilling fluid cleaning system (not shown) and then recirculated back into the flow passage 24. The mud pulse telemetry system 10 in accordance with the current invention is shown positioned at a down hole location 30 within the flow passage 24 of the drill string.

Figure 2:
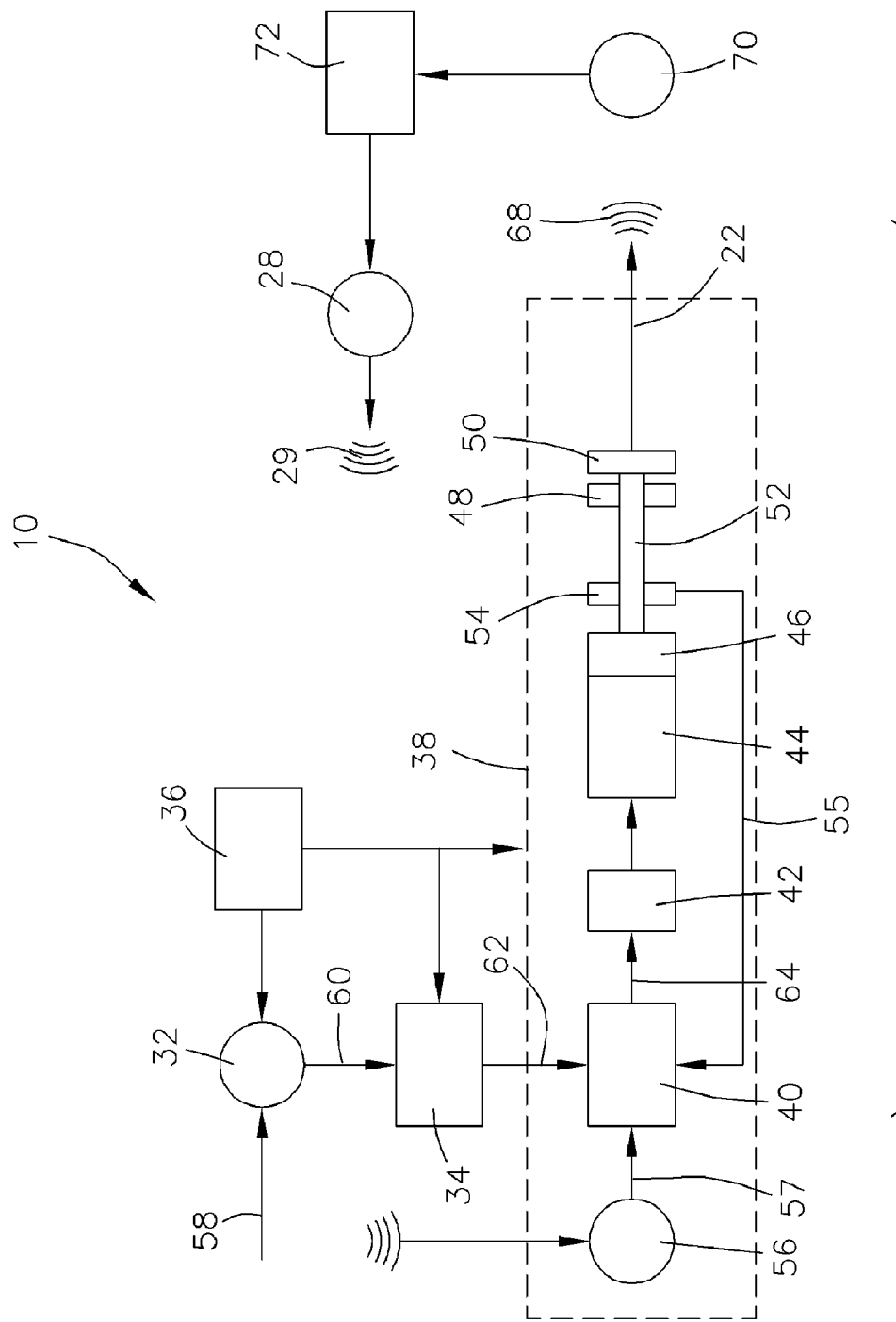
FIG. 2 is a schematic diagram of the mud pulser telemetry system in accordance with the present invention.

With reference to FIG. 2, a basic system diagram of the mud pulse telemetry system 10 is shown. The telemetry system 10 includes sensor package 32 for measuring down hole parameters, a data encoder 34, a power supply 36, which may be a battery or turbine, and a pulser 38. The pulser 38 comprises a controller 40, which may be a microprocessor, motor driving circuitry 42, a motor 44, such as a reversible brushless DC motor that operates at a minimum of 1000 RMP, a reduction gear box 46 that can provide a speed reduction of at least about 200:1, a stator 48, a rotor 50, a drive shaft 52 directly coupling the output of the motor to the rotor, an angular position encoder 54, and a drilling fluid pressure sensor 56.

Sensor package 32 can include a single sensor or multiple sensors for measuring various down hole parameters such as but not limited to inclination or drift of the drilling string, azimuth of the drill string, pressure, temperature, voltage, and shock. The sensor package 32 receives or measures information 58 useful in connection with the drilling operation and sends output signals 60 to the data encoder 34. The data encoder 34 receives the output signals 60 and generates a digital code 62 that is transmitted to the controller 40. The controller 40 processes the digital code and generates command signals 64 to the motor driving circuitry 42. The motor driving circuitry 42 operates the motor 44 in accordance with the command signals to rotate the rotor 50 to generate pressure pulses 68 in the drilling fluid 22. The pressure pulses 68 are sensed by a sensor 70 positioned at the surface and are decoded and processed by a data acquisition system 72. The angular position encoder 54 suitable for high temperature applications is coupled to the output of the motor 44. The angular position encoder 54 sends signal 55 to the controller 40 containing information of the angular position of the rotor 50, which may also be used by the controller in generating command signals 64. The drilling fluid pressure sensor 56 measures the pressure of the drilling fluid 22 within the flow passage 24 and transmits signal 57 to the controller 40 containing information pertaining to the pressure of the drilling fluid.

Further, the mud pulse telemetry system 10 may include a pressure pulse generator 28 positioned at the surface for generating pulses 29 within the drilling fluid 22. The pressure pulse 29 may be encoded with operation information and are received by drilling fluid pressure sensor 56 and transmitted to the controller 40. The operation information may be used by the controller 40 in generating command signals 64.

Figure 3:
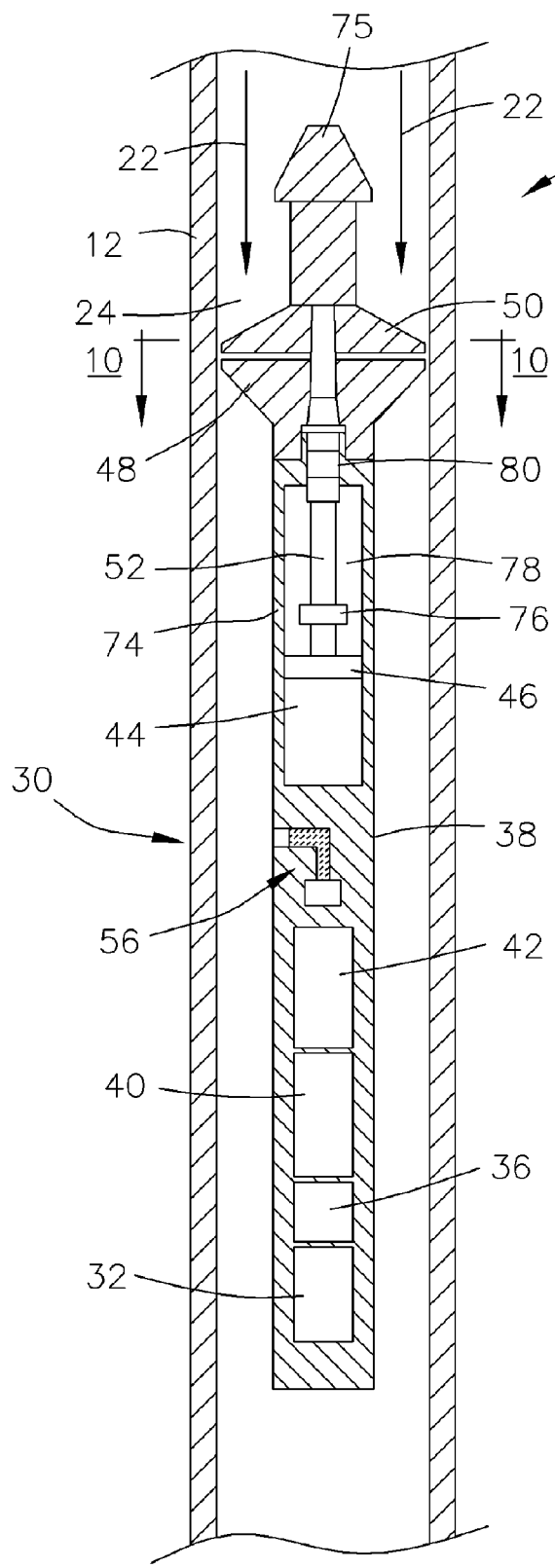
FIG. 3 is a diagram, partially schematic, showing the basic mechanical arrangement of a pulser according to the current invention.

With reference to FIG. 3, a partial schematic diagram of the mechanical arrangement of the pulser 38 is shown. The pulser 38 is shown positioned with the flow passage 24 of the drill string 12 at the down hole location 30 such that the drilling fluid 22 is caused to flow across the pulser. The pulser 38 can be fixedly attached to the drilling string 12 or removably attached to the drilling string through the use of a conventional hanger sleeve (not shown) to facilitate wire line placement and retrieval of the pulser. A wire line is removable attachable to a spear point 75 forming part of the pulser 38.

The rotor 50 is preferably positioned upstream of the stator 48 and is driven by a drive train positioned within the pulser body 74. The rotor is connected to a drive shaft 52 which is supported by a bearing assembly 76. The drive shaft is connected to a reduction gear box 46 which is coupled to the output of the motor 44. The motor 44, the reduction gear box 46 and a portion of the drive shaft 52 is positioned within an internal housing 78 defined by the pulser body 74. A seal 80 is positioned about the drive shaft 52 such that the drive shaft extends axially through the seal and such that seal seals the internal housing 78. The internal housing is gas filled, preferably with an inert gas and at atmospheric pressure.

The pressure sensor 56 is received by the pulser body 74 such that the pressure of the drilling fluid 22 within the flow passage 24 may be measured. Additionally, the pulser body 74 houses the controller 40, the motor driving circuit 42, and the sensor package 32.

With reference to FIGS. 4-13 a preferred embodiment of the telemetry system 10 is shown positioned at a down hole location 30 within a flow passage 24 of the drilling string 12. The pulser 38 is of an elongated cylindrical shape of a dimension permitting the placement of the pulser within the flow passage 24 without unduly restricting the flow of drilling fluid 22 through the flow passage 24. The pulser 38 includes a pulser body 74 that can be of a unitary construction or can be of a plurality of separate body members coupled together as shown. As previously mentioned, the pulser body 74 can be fixedly mounted to the drill string 12 or removably mounted to the drill string through the use of a conventional hanger sleeve 82 which is attached to the drill string. The pulser includes at its upstream most end a spear point 75 which is engagable with a wire line for placement and retrieval of the pulser 38.

Figure 10:
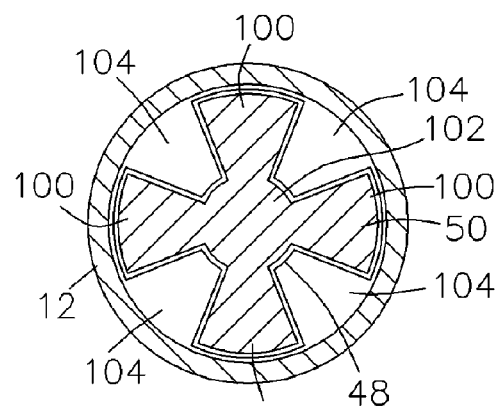
FIG. 10 is a diagrammatic, transverse cross-sectional view taken along line 10-10 in FIG. 3 showing the rotor and stator in accordance with the pulser of the present invention.
Figure 11:
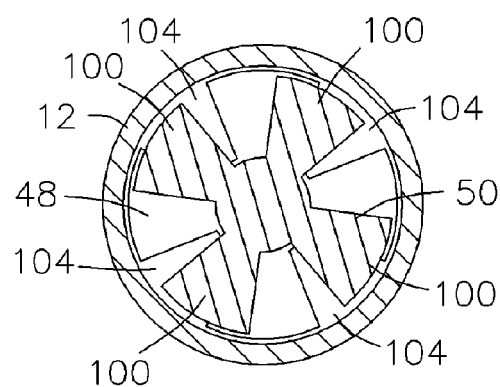
FIG. 11 is the diagrammatic transverse cross-sectional view of FIG. 10 showing the rotor in a secondary position with respect to the stator.
Figure 4:
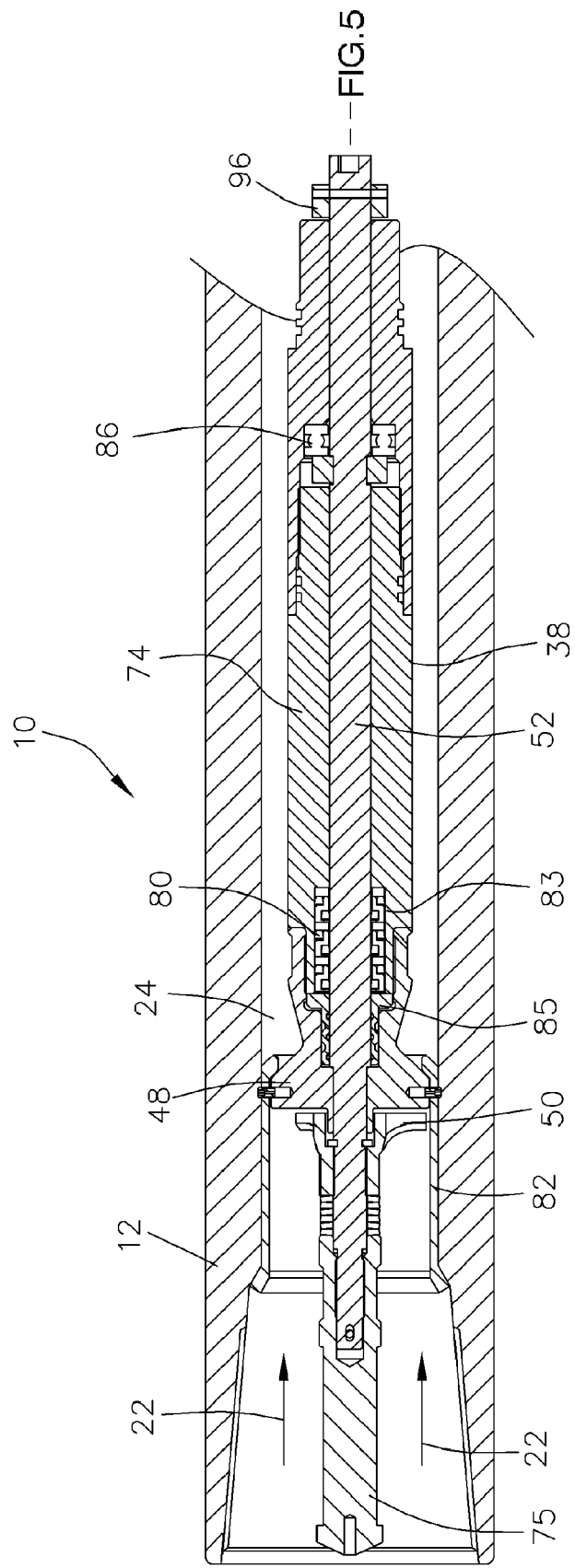
FIGS. 4-9 are consecutive portions of a longitudinal cross-section through the pulser and a portion of the drilling string at the bottom hole location.

A rotor 50 is positioned within the flow passage 24 coaxially with the drill string 12 and preferably upstream of a stator 48. With additional reference to FIGS. 10 and 11, which are transverse cross-section views of the pulser 38 taken through the rotor 50, the rotor includes a plurality of lobes 100 extending radially from a center portion 102 and the stator includes a plurality of channels 104 equal to the number of lobes 100 through which the drilling fluid 22 is directed. The rotor 50 is rotatable with respect to the stator 48 such that the lobs 100 of the rotor are positioned to at least partially block the drilling fluid 22 from flowing through the channels 104 of the stator as shown in FIG. 11 and is rotatable to at least partially reduce the blockage as shown in FIG. 10.

Figure 5:
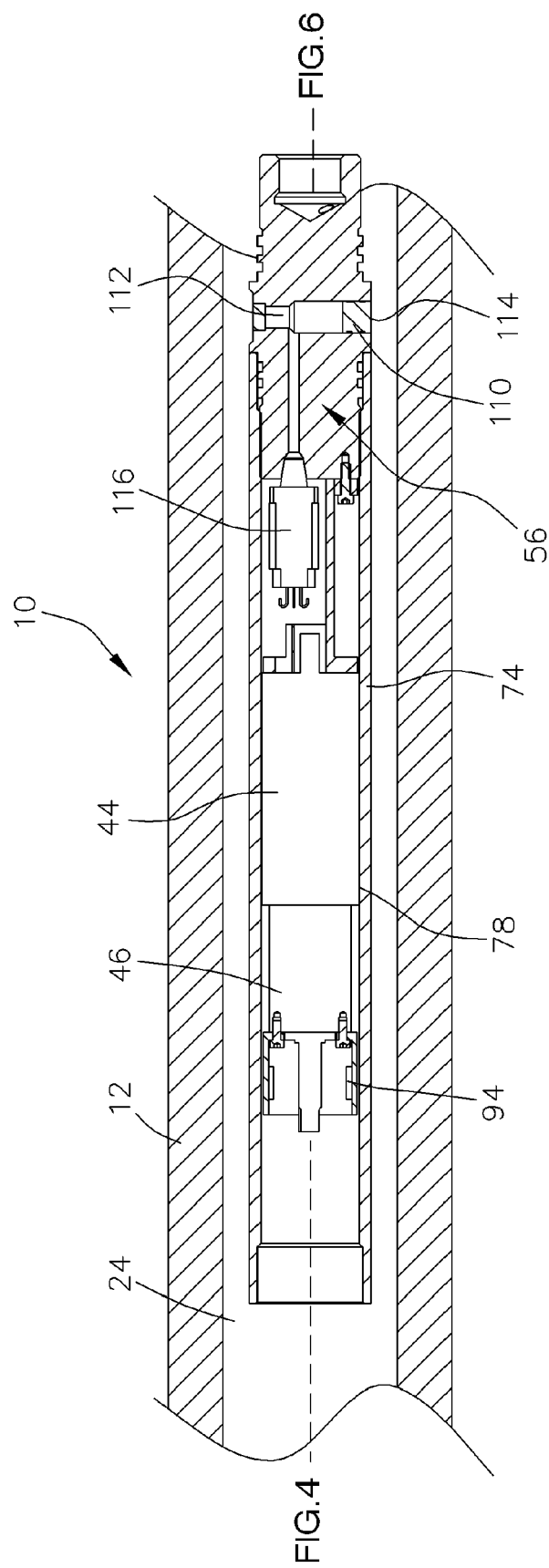

The rotor 50 is connected to a drive shaft 52 which extends axially through the stator 48 and the pulser body 74. The drive shaft 52 is support at an upstream end of the pulser body 74 by a bushing 85 and at a downstream end by a bearing 86 and is coupled to a reduction gear box 46, which is in turn coupled to the output of a motor 44, as shown in FIG. 5. The motor 44, the reduction gear box 46 and a portion of the drive shaft 52 is positioned in an internal housing 78 defined by the pulser body 74. The internal housing 78 is filled with gas, such as air or preferably an inert gas and at atmospheric pressure. A seal 80, which will be described in further detail below, is positioned about the drive shaft 52 such that the drive shaft extends axially through the seal and such that the seal seals the internal housing 78. A seal housing 83 defined by the pulser body 74 receives the seal 80.

The pulser 38 includes a fluid pressure sensor 56 for measuring the pressure of the drilling fluid 22 within the flow passage 24. The fluid pressure sensor 56 can comprises a piston 110 received within pressurized oil filled bore 112 defined by the pulser body 74. The piston 110 has an outward facing surface 114 which is contactable by the drilling fluid 22. The piston 110 is caused to displaced inward or outward depending upon the drilling fluid pressure exerted upon the outward facing surface. The inward and outward displacement of the piston 110 is related to the pressure differential between the pressure of the drilling fluid 22 and the pressure of the oil within the bore 112. An inward displacement of the piston 110 compresses the oil and increases the pressure within the bore 112. Similarly, an outward displacement of the piston 110 decompresses the oil and decreases the pressure within the bore 112. The pressure within the bore is measured by a transducer 116 that generates a pressure signal 57 and transmits the pressure signal to a controller 40.

An angular position encoder 54 suitable for high temperature applications is coupled to the output of the gear box 46. The angular position of the rotor attached to the shaft 52 is defined by the angular position encoder 54, and the hall sensors built into the motor 44 which sends signal 55 to the controller 40 containing information of the angular position of the rotor 50, which may also be used by the controller in generating command signals 64. The angular position encoder can be that of a hall effect sensor 94 positioned about the drive shaft 52 and a magnet 96 secured to the drive shaft. The angular position encoder 54 defines a known angular point of the draft shaft 52 which in turn results in a known position of the rotor 50 attached to the drive shaft. The telemetry system 10 uses this point as a start reference, the drive shaft 52 is rotated x number of counts in a direction to at least partially block or at least partially reduce the blockage the flow passage 24 by counting the pulses generated by the angular position encoder.

Figure 6:
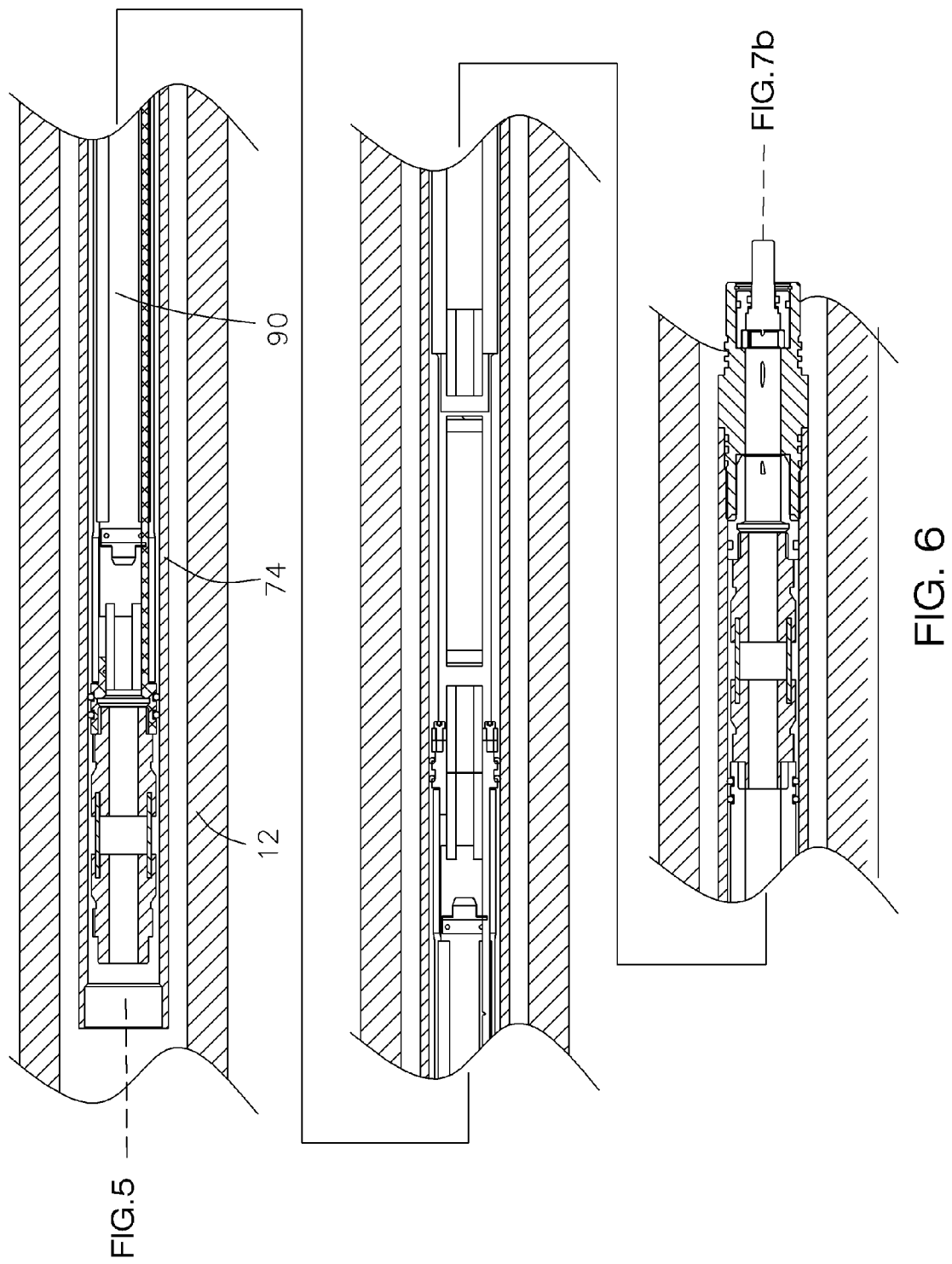
Figure 7:
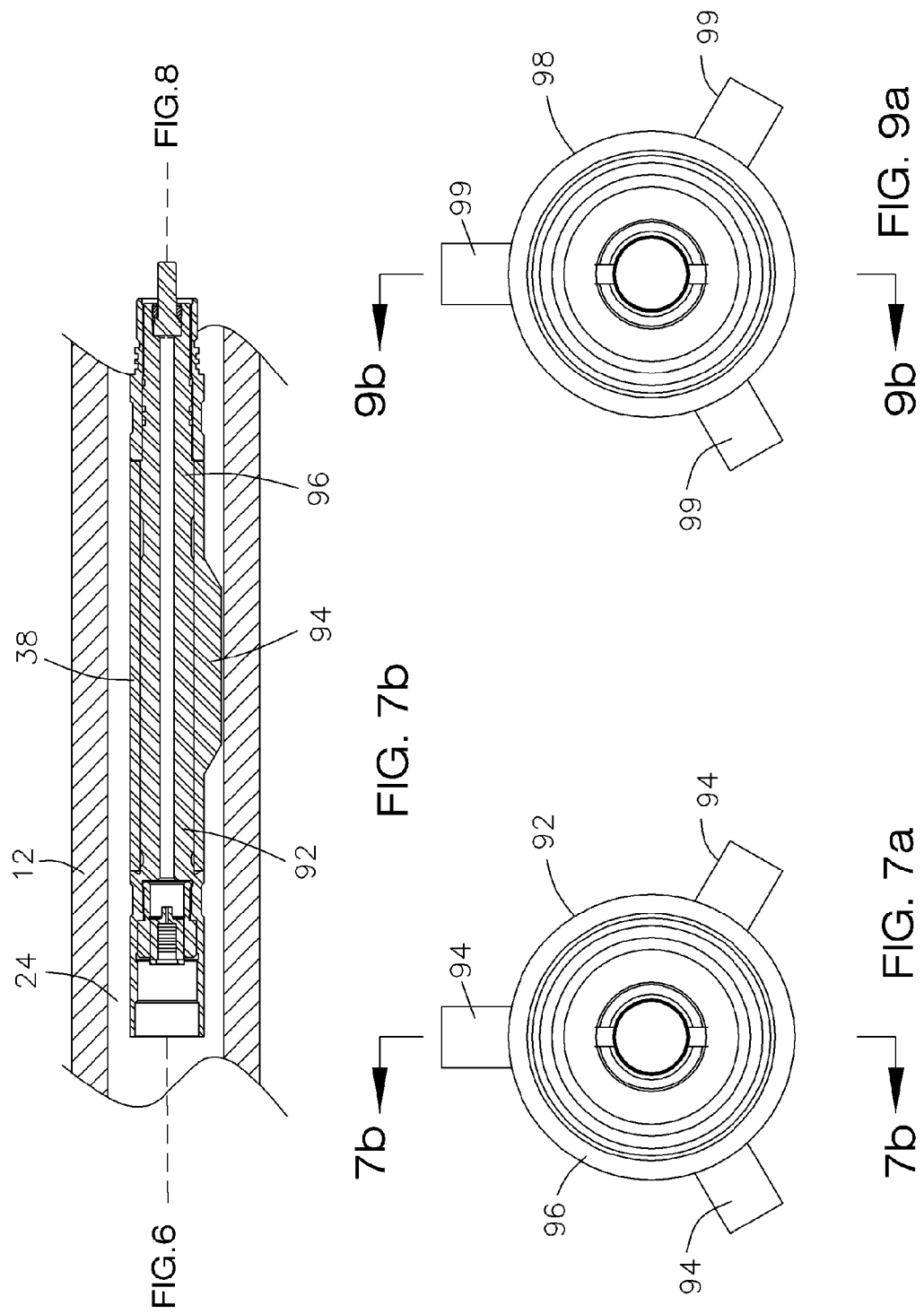

As shown in FIG. 6 the pulser body 74 defines an electronics housing 90 which is positioned therein the various electronic assemblies of the telemetry system 10, such as but not limited to the controller 40, a motor driving circuit 42, and a sensor package 32. The sensor package 32 can include various sensors such as but not limited to a drift or inclination sensor, an azimuth sensor, a temperature sensor, a pressure sensor and a shock sensor.

Figure 8:
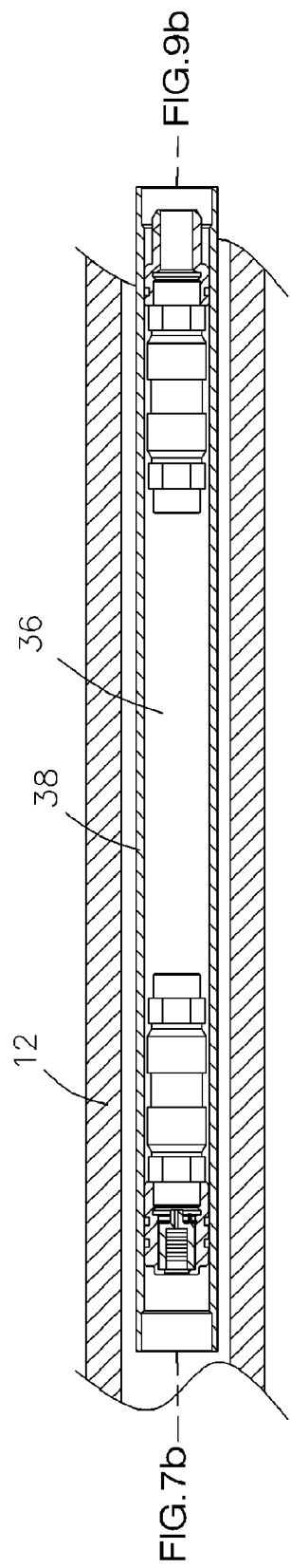
Figure 9B:
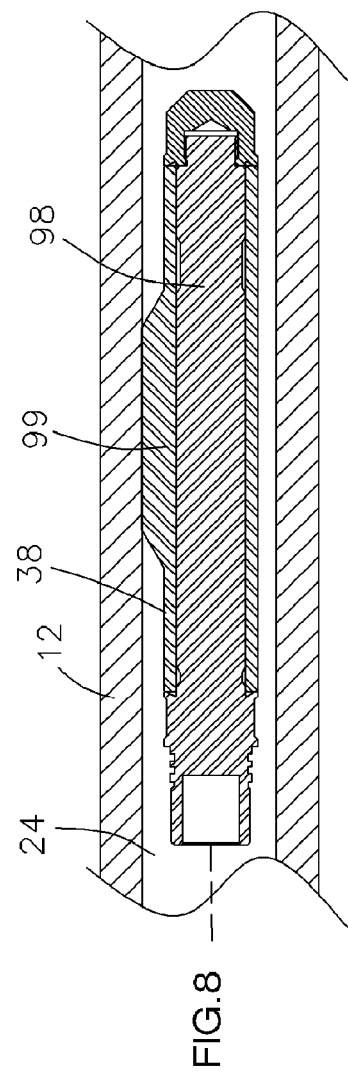

The pulser 38 further includes a mid centralizer 92 an end view thereof is shown in FIG. 7a and a longitudinal cross-section is shown in FIG. 7b. The mid centralizer includes a plurality of centralizing blades 94 which extend from the body 96 thereof. The centralizing blades 94 contact the inner surface of the drill string 12 and centralize the pulser body 74 within the flow passage 24. A power supply 36, such as a battery back, is also provided and is shown in FIG. 8. Further, a bottom centralizer 98, shown in FIGS. 9a and 9b, is included and acts to centralize the bottom of the pulser 38 within the flow passage 24. As in the mid-centralizer 92, the bottom centralizer 98 includes a plurality of centralizing blades 99 which contact the inner surface of the drill string 12.

Figure 13:
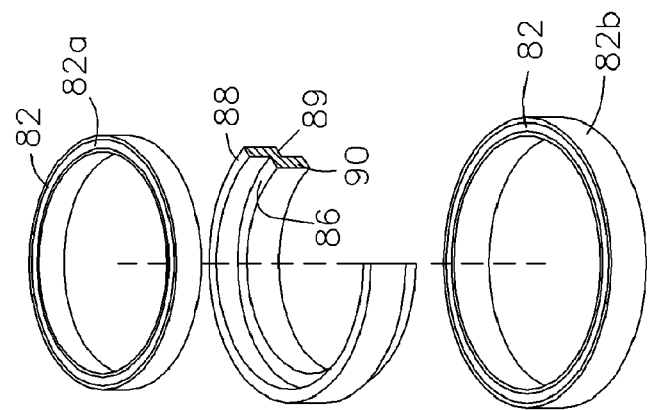
FIG. 13 is a perspective, explode view of a partial section of the seal.
Figure 12:
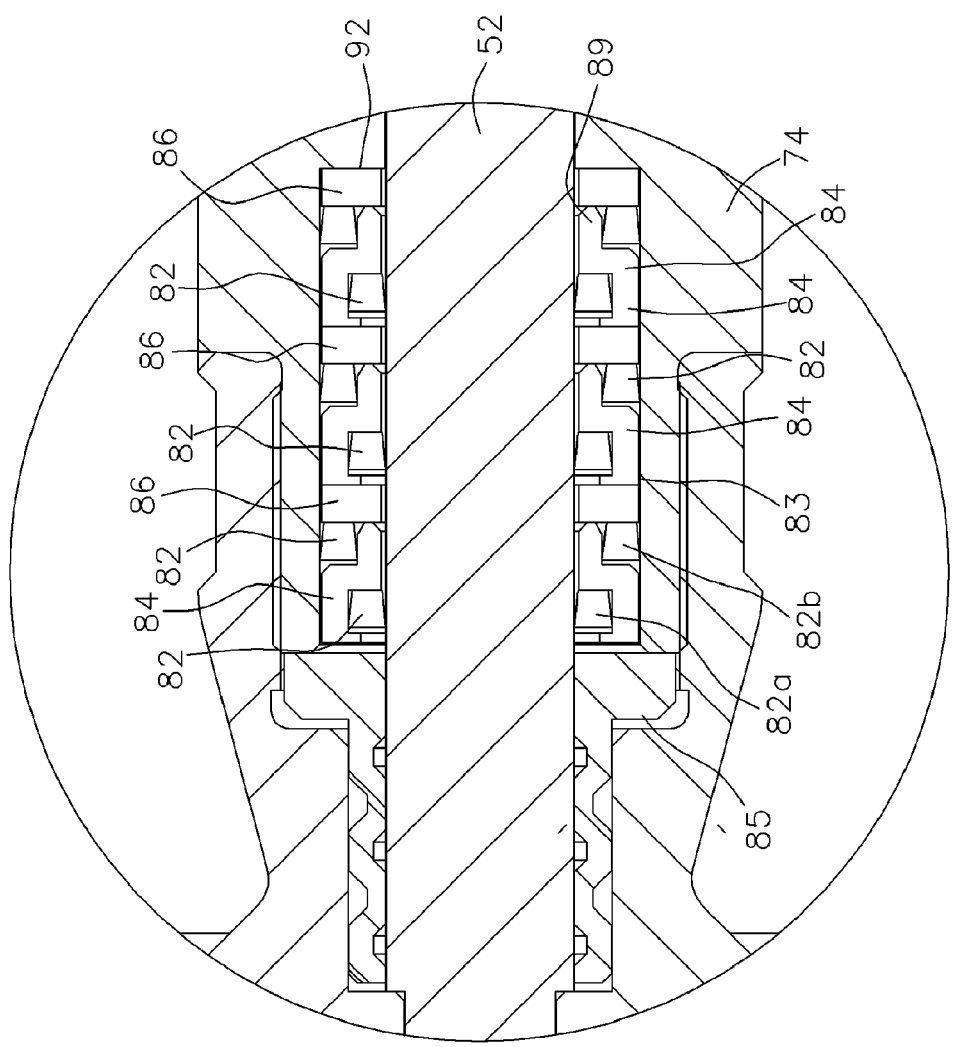
FIG. 12 is an enlarged, detailed cross-section view of a seal in accordance with the present invention.

Now with reference to FIGS. 12 and 13, a detailed discussion of the seal 80 will be had. FIG. 12 is an enlarged longitudinal cross section of the seal 80 and FIG. 13 is a partial explode view of the seal. The seal 80 provides an uncompensated drive train for the pulser 38 which simplifies and reduces manufacturing and maintenance costs of the pulser. Heretofore, pulsers have had a compensated drive train where all or at least part of the drive train is positioned within pressurized oil filled housing. This was required to eliminate a high pressure differential across a seal where a driving shaft of the drive train would exit the housing into the drilling fluid to create either a rotating action or a reciprocating action to drive an actuator such as a rotor or a hydraulic valve. Without the compensation and under a high pressure differential there is a high amount of friction or seal drag across the seal requiring a large torque to drive the shaft making battery operated devices undesirable. Further under a high pressure differential, when the shaft has been broken free to move it is very prone to leakage.

The seal 80 in accordance with the present invention provides the pulser 38 with an uncompensated drive train that overcomes all of the drawbacks of a compensated drive train and which efficiently operates under a high pressure differential. The seal 80 is received within a seal housing 83 defined by the pulser body 74 as shown. The seal 80 encompasses the drive shaft 52 which extends axially through the seal. The seal 80 comprises of a unique stacked array of a plurality of seal elements 82 held by a plurality of seal holders 84 and seal washers 86 positioned intermediate of adjacent seal holders 84. Preferably, the seal elements are of a polypack or a poly-O type seal. The seal elements 82 are positioned about the drive shaft 52 and retained in position by the seal holders 84. Each seal holder 84 positions and retains two seal elements 82, one of the seal elements 82a being retained juxtaposed the surface of the drive shaft 52 and the second of the seal elements 82b being retained juxtaposed the surface of the seal housing 83. The first seal element 82a is of a diameter less than that of the second seal element 82b. Each seal holder 84 is generally cylindrical in shape and includes first shoulder 86 of a first diameter, a first lip 88 extending upwardly from the outer circumference of the first shoulder, a second shoulder 89 of a second diameter that is greater then the diameter of the first shoulder, and a second lip 90 extending from the inner circumference of the second shoulder in a direction opposite of the first lip.

In a preferred arrangement, the seal holders 84 each retaining two seal elements 82 are positioned about the drive shaft 52 such that seal elements 82a and 82b are arranged in an alternating pattern. As shown, three seal holders 84 each retaining two seal elements 82 for a total of six seal elements are positioned about the drive shaft 52 and within the seal housing 83 in a stacked arrangement. A seal washer 86 is positioned between the first and second seal holders, a second seal washer is positioned between the second and third seal holders, and a third seal washer is positioned between the third seal holder and a bottom edge 92 of the seal housing. A bushing 85 retained by the pulser body 74 is positioned above the seal 80 and retains the seal within the seal housing 83.

It can know be understood, in operation, the mud pulse telemetry system 10 is designed to function in agreement with a process know as "making a connection" in a drilling operation. The process of making a connection involves the coupling of an additional pipe section to the drilling string as a bore hole is drilled deeper into a formation. To facilitate the coupling of an additional pipe section, the drilling is stopped and the drilling fluid pump 20 is turned off to stop pumping drilling fluid 12 through the drill string 12 and to reduce drilling fluid pressure within the drilling string to a static pressure which is less then the pressure of the drilling fluid during pump on operation. The mud pulse telemetry system 10 makes use of this intermittent cessation of drilling to take measurements of down hole parameters which are useful for the drilling operation. The cessation of drilling is detected by measuring the pressure of the drilling fluid 22 within the flow passage 24. Once a predetermined drop of drilling fluid pressure, the telemetry system 10 determines it is time to take down hole measurements at a time after the pressure drop is detection. Upon a detection of a predetermined rise of drilling fluid pressure, the telemetry system 10 begins to operate the pulser 38 at a time after the pressure rise is detected to generate encoded pressure pulses within the drilling fluid.

In one aspect, the telemetry system 10 can operate in either a short survey mode and a long survey mode. In the short survey mode one only down hole parameter information, such as inclination, is be transmitted to the surface. In the long survey mode multiple sets of information pertaining to various down hole parameters, such as inclination, azimuth, temperature, shock, pressure or battery voltage, is transmitted to the surface. The telemetry system 10 may also operate in a combined short and long survey mode where the telemetry system operates in the short survey mode and then in the long survey mode. The telemetry system 10 may operate in the short survey mode for a number of information transmission and then switch to the long survey mode of another number of information transmission and then back to the short survey mode.

The pressure pulses 68 are sensed by a sensor 70 positioned at the surface and are decoded and processed by a data acquisition system 72. The data acquisition system 72 displays pressure data in a time vs. pressure chart and automatically decodes the survey data and displays the drift (inclination of the drill string) corresponding to time and date in a table. The drill operator then can enter the depth of the drilling string if reading is acceptable. Each time a depth is entered corresponding to a drift measurement, a point is plotted on a depth vs. drift graph which is displayed to the drill operator to use in making any necessary drilling changes.

A number of embodiments of the present invention have been described. Nevertheless, it will be understood that various modifications may be made without departing from the spirit and scope of the invention. Accordingly, other embodiments are within the scope of the following claims.

What is claimed is:

1. A telemetry apparatus for transmitting information from a drill string positioned at a down hole location in a bore hole to a surface location, the drill string having a flow passage through which a drilling fluid flows, the telemetry apparatus comprising:
   a pulser positioned within the flow passage approximate the down hole location for generating a series of positive pressure pulses in the drilling fluid which are encoded to contain the information to be transmitted, said pulser comprising:
   a rotor capable of at least partially blocking the flow passage;

a motor positioned within an internal housing defined by said pulser, said housing being filled by a gas at atmospheric pressure;

a drive shaft extending from said drive motor to a position external of said internal housing, said drive shaft connected to said rotor;

a seal positioned about said drive shaft such that said seal seals said internal housing;

wherein said seal comprises:

a plurality of seal elements;

a plurality of seal carriers holding said plurality of seal elements; and wherein said plurality of seal elements include a first group of seal elements of a first seal diameter and a second group of seal elements of a second seal diameter, and wherein said plurality of seal elements are held by said plurality of seal carriers such that first and second group of seals are arranged in an alternating pattern.

2. The telemetry apparatus of claim 1, further comprising: a plurality of seal washers positioned intermediate of adjacent seal carriers.

3. The telemetry apparatus of claim 1, wherein each of said plurality of seal elements are polypack type seal elements.

4. The telemetry apparatus of claim 1, wherein said pulser further comprises:

a stator co-axially aligned with said rotor and having at least one flow channel through which the drilling fluid is directed; and said rotor being angularly rotated by said motor into a first operative position where said rotor at least partially blocks said at least one flow channel and into a second inoperative position where the drilling fluid is free to flow through said at least one flow channel.

5. The telemetry apparatus of claim 1, further comprising:

a sensor package for measuring down hole parameters;

a data encoder operatively connected to said sensor package;

a controller operatively connected to said drive motor and said data encoder;

a surface sensor for receiving said positive pressure pulses;

a data acquisition system operatively connected to said surface sensor; and a power supply connected to said sensor package, data encoder, controller, and said drive motor.

6. The telemetry apparatus of claim 1, wherein each of said plurality of seal carriers includes a first shoulder for holding one of said plurality of seal elements juxtaposed said drive shaft and a second shoulder for holding another of said plurality of seal elements juxtaposed a wall of said seal housing.

7. The telemetry apparatus of claim 6, wherein said seal housing is an axial bore defined by said pulser through which said drive shaft passes axially therethrough.

8. A telemetry apparatus for transmitting information from a drill string positioned at a down hole location in a bore hole to a surface location, the drill string having a flow passage through which a drilling fluid flows, the telemetry apparatus comprising:

a body for positioning in the flow passage of the drill string approximate the down hole location, said body directing the drilling fluid therethrough;

a rotor capable of at least partially blocking the flow passage when rotated into a first position and at least partially reducing the blockage when rotated into a second position, wherein rotation of said rotor creates positive pressure pulses in the drilling fluid, which are encoded to contain the information to be transmitted;

a drive motor positioned within an gas filled internal housing that is defined by said body;

a drive shaft extending from said motor at least partially outward from said internal housing and connected to said rotor;

a seal received by said body such that said drive shaft extends axially through said seal and such that said seal seals said internal housing;

wherein said seal comprises:

a plurality of seal elements; and a plurality of seal carriers holding said plurality of seal elements; and wherein said plurality of seal elements include a first group of seal elements of a first seal diameter and a second group of seal elements of a second seal diameter, and wherein said plurality of seal elements are held by said plurality of seal carriers such that first and second group of seals are arranged in an alternating pattern.

9. The telemetry apparatus of claim 8, wherein said internal chamber is at atmospheric pressure.

10. The telemetry apparatus of claim 8 further comprising:

a pressure sensor positioned such that the drilling fluid within the flow passage acts upon the sensor for measuring the drilling fluid pressure within the flow passage;

a measurement sensor for measuring a down hole parameter; and a microprocessor connected to said pressure sensor, said measurement sensor and said motor for taking drilling fluid pressure readings, down hole parameter measurement and controlling the operation of said motor to rotate said rotor based upon the drilling fluid pressure and the down hole parameter measurement, thereby generating the positive pressure pulses within the drilling fluid.

11. The telemetry apparatus of claim 10, wherein the down hole parameter is inclination of the drill string.

12. The telemetry apparatus of claim 10, wherein the internal chamber is at atmospheric pressure.

* * * * *